(12) United States Patent
Hashimoto

(10) Patent No.: US 7,802,596 B2
(45) Date of Patent: Sep. 28, 2010

(54) PNEUMATIC TIRE WITH TREAD HAVING CENTER LAND AND ASSISTANT GROOVES

(75) Inventor: Yoshimasa Hashimoto, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 94 days.

(21) Appl. No.: 12/281,441

(22) PCT Filed: Dec. 18, 2007

(86) PCT No.: PCT/JP2007/074314

§ 371 (c)(1),
(2), (4) Date: Sep. 2, 2008

(87) PCT Pub. No.: WO2009/047872

PCT Pub. Date: Apr. 16, 2009

(65) Prior Publication Data

US 2010/0078105 A1    Apr. 1, 2010

(30) Foreign Application Priority Data

Oct. 12, 2007   (JP) ............................. 2007-266656

(51) Int. Cl.
*B60C 11/12*   (2006.01)

(52) U.S. Cl. ........................... 152/209.18; 152/209.27; 152/902; 152/DIG. 3

(58) Field of Classification Search ............... 152/209.2, 152/209.18, 209.27, 902, DIG. 3
See application file for complete search history.

(56) References Cited

U.S. PATENT DOCUMENTS 4,545,415 A * 10/1985 Lindner et al. ............... 152/902
5,526,860 A * 6/1996 Minami .................. 152/209.18
2007/0089821 A1 * 4/2007 Kishizoe .................. 152/209.2

FOREIGN PATENT DOCUMENTS

| EP | 506279 | * | 9/1992 |
|----|--------|---|--------|
| JP | 07-215013 | * | 8/1995 |
| JP | A 2000-229505 | | 8/2000 |
| JP | A 2000-255217 | | 9/2000 |

(Continued)

OTHER PUBLICATIONS

Machine translation for Japan 2002-059710, Feb. 1, 2010.*
Machine translation for Japan 2000-280713, Feb. 1, 2010.*
Machine translation for Japan 07-215013, Apr. 25, 2009.*

*Primary Examiner*—Steven D Maki
(74) *Attorney, Agent, or Firm*—Greer, Burns & Crain, Ltd.

(57) ABSTRACT

There is provided a pneumatic tire capable of improving on-snow performance on a snowy road surface including a sherbet-like snowy road surface without deteriorating on-ice performance. An assistant groove 6 less in width than the main grooves 2 extends in the circumferential direction TC of the tire in each middle land 4. The lateral grooves 7 include right and left first lateral grooves 8 extending from the center land 3 outward in the widthwise direction of the tire beyond the tire ground contact ends TF, and right and left second lateral grooves 9 extending from the middle lands 4 outward in the widthwise direction of the tire beyond the tire ground contact ends TF, the first lateral grooves 8 and second lateral grooves 9 being alternately disposed in the circumferential direction TC of the tire. The groove area percentage in the center region portion 1C of the tread surface 1 is less than the groove area percentage in the ground contact surface region G of the tread surface 1.

10 Claims, 3 Drawing Sheets

FOREIGN PATENT DOCUMENTS

| JP | 2000-280713 | * | 10/2000 |
| JP | 2002-059710 | * | 2/2002 |
| JP | A 2003-146020 | | 5/2003 |
| JP | A 2005-349970 | | 12/2005 |
| JP | A 2006-151173 | | 6/2006 |
| JP | A 2006-232151 | | 9/2006 |

* cited by examiner

PNEUMATIC TIRE WITH TREAD HAVING CENTER LAND AND ASSISTANT GROOVES

This application is a U.S. National Phase under 35 U.S.C §371, of International Application No. PCT/JP2007/074314, filed Dec 18, 2007.

TECHNICAL FIELD

The present invention relates to a pneumatic tire used on an icy and snowy road, and more particularly, to a pneumatic tire which can improve on-snow performance on a snowy road surface including a sherbet-like snowy road surface.

TECHNICAL BACKGROUND

As one of pneumatic tires used on an icy and snowy road, a pneumatic tire as shown in FIG. 4, for example, is conventionally known. This pneumatic tire has a tread surface 21 provided with sipes 20, four main grooves 22 extending in the circumferential direction of the tire and lateral grooves 23 extending in the widthwise direction of the tire being disposed in the tread surface with proper adjustment, thereby improving on-ice performance and on-snow performance in a balanced manner (see a patent document 1, for example).

In recent years, due to global warming, opportunities when vehicles run on sherbet-like snowy road surfaces in snowfall areas have increased. It can not be said that a conventional tire used on an icy and snowy road as described above substantially satisfies on-snow performance on a snowy road surface including a sherbet-like snowy road surface; a technical approach for improving on-snow performance on a snowy road surface including a sherbet-like snowy road surface is required without deteriorating on-ice performance.

Patent Document 1: Japanese Patent Application Kokai Publication 2005-349970

DISCLOSURE OF THE INVENTION

Problems to be Solved by the Invention

An object of the present invention is to provide a pneumatic tire capable of improving on-snow performance on a snowy road surface including a sherbet-like snowy road surface without deteriorating on-ice performance.

Means for Solving the Problems

In order to achieve the above object, the present invention provides a pneumatic tire having a tread surface, four main grooves extending in a circumferential direction of the tire being provided in the tread surface, the four main grooves comprising two first main grooves disposed on right and left sides of an equatorial plane of the tire, and two second main grooves disposed outward of the two first main grooves in a widthwise direction of the tire, a center land being formed between the first main grooves, middle lands being formed between the first main grooves and the second main grooves, shoulder lands being formed outward of the second main grooves in the widthwise direction of the tire, sipes extending in the widthwise direction of the tire being disposed in each of the lands at prescribed intervals in the circumferential direction of the tire, lateral grooves extending in the widthwise direction of the tire being provided in the tread surface at prescribed intervals in the circumferential direction of the tire, wherein: the middle lands each have an assistant groove less in width than the first and second main grooves, the assistant groove extending in the circumferential direction of the tire; the lateral grooves comprise right and left first lateral grooves and right and left second lateral grooves disposed on the right and left sides of the equatorial plane of the tire, the right and left first lateral grooves and the right and left second lateral grooves being alternately disposed in the circumferential direction of the tire, the right and left first lateral grooves extending from the center land outward in the widthwise direction of the tire beyond ground contact ends of the tire, the right and left second lateral grooves extending from the middle lands outward in the widthwise direction of the tire beyond the ground contact ends of the tire, the right and left first lateral grooves having inner terminal ends which are disposed so as to be apart from each other in the center land, the right and left second lateral grooves having inner terminal ends which are located within the middle lands; and the tread surface has a ground contact surface region located between the right and left ground contact ends of the tire, the ground contact surface region having a center region portion on a center side thereof and side region portions located on opposite sides of the center region portion, a groove area percentage in the entire ground contact surface region being in a range of 18% to 33%, a groove area percentage in the center region portion being less than the groove area percentage in the entire ground contact surface region.

Effect of the Invention

According to the present invention described above, since the right an left first lateral grooves extending from the center land beyond the tire ground contact ends are arranged in the circumferential direction of the tire in addition to the four main grooves extending in the circumferential direction of the tire, both drainage characteristics and snow-expelling characteristics can be ensured by way of the grooves. Therefore, snow-expelling characteristics during running on a sherbet-like snowy road surface are enhanced, and driving performance on a sherbet-like snowy road surface can be improved.

Since the inner terminal ends of the second lateral grooves are located within the middle lands, land portions which are greater in length in the circumferential direction of the tire are formed on the tire equatorial plane sides of the middle lands, which increases rigidity of the tread surface on the center side and provides a high edge effect on ice by means of the sipes placed there; the groove area percentage in the center region portion of the tread surface is less, whereby the ground contact area of the tread surface on the center side is enlarged, enhancing icy-road-hugging properties; accordingly, good on-ice performance in the same level as that of the prior art tire can be obtained.

By disposing the assistant grooves extending in the circumferential direction of the tire in addition to the four main grooves extending in the circumferential direction of the tire, cornering performance on a snowy road surface can be maintained in the same level as that of the prior art tire; since the groove area percentage in the side region portions outward of the center region portion in the widthwise direction of the tire are greater, snow-expelling characteristics of the shoulder sides are enhanced; accordingly, cornering performance on a snowy road surface can be improved.

Figure 1:
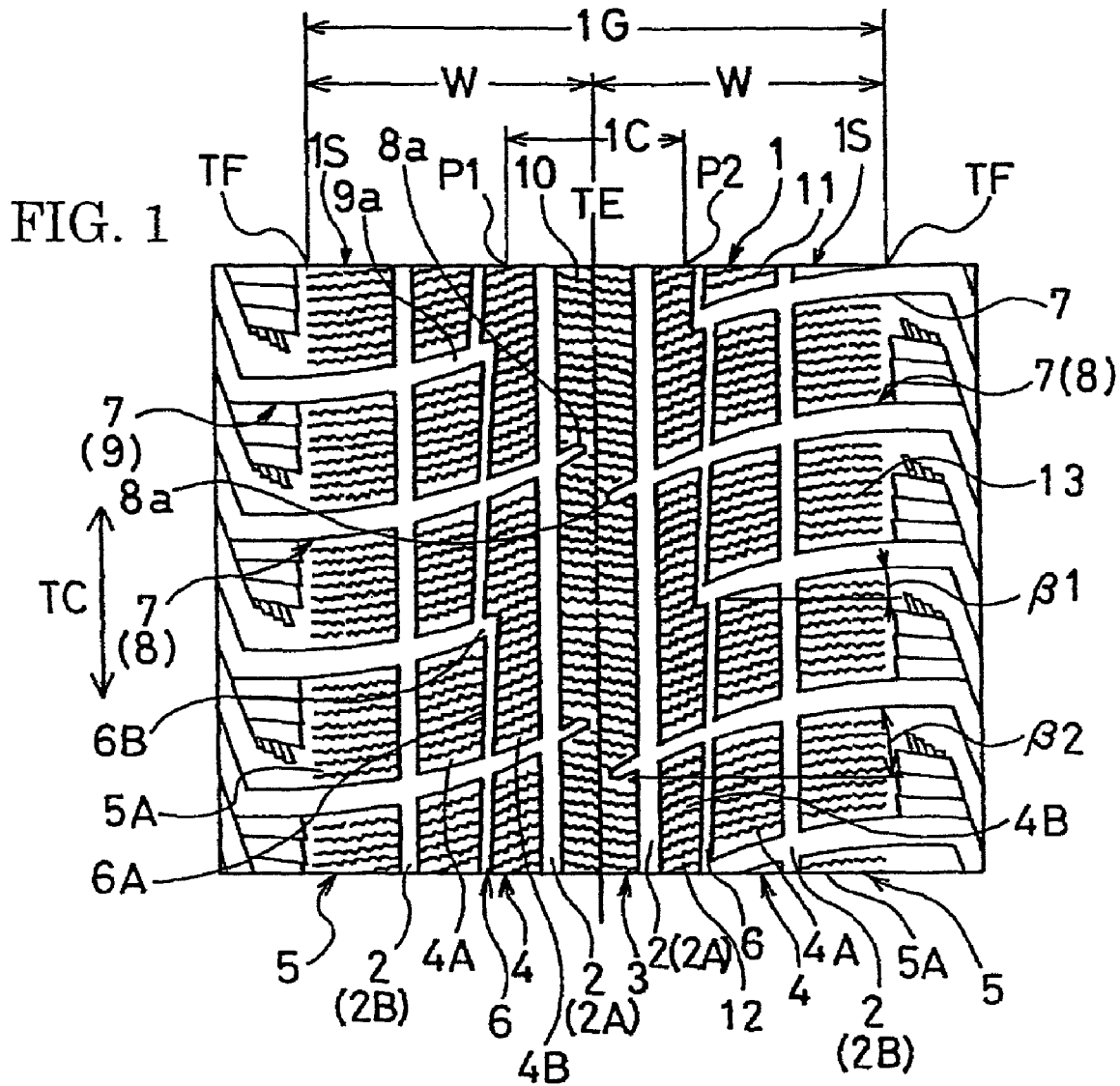
FIG. 1 is a partial development view of a tread surface showing an embodiment of a pneumatic tire according to the present invention.

DESCRIPTION OF THE SYMBOLS 1 tread surface
1C center region portion
1G ground contact surface region
2 main groove
2A first main groove
2B second main groove
3 center land
3A block
4 middle land
4A first block
4B second block
5 shoulder land
6 assistant groove
6A first inclination portion
6B second inclination portion
7 lateral groove
8 first lateral groove
8a inner terminal end
9 second lateral groove
9a inner terminal end
10, 11, 12, 13 sipe
14 sub-groove
P1, P2 position
TC circumferential direction of tire
TE equatorial plane of tire
TF ground contact end of tire

BEST MODES FOR CARRYING OUT THE INVENTION

Embodiments of the present invention will be described in detail below with reference to the attached drawings.

Referring to FIG. 1, there is shown an embodiment of a pneumatic tire according to the present invention; reference numeral 1 denotes a tread surface, and reference character TE denotes an equatorial plane of the tire. Four main grooves 2 extending straight in the circumferential direction TC of the tire are provided in the tread surface 1. The four main grooves 4 comprise two first main grooves 2A disposed on the right and left sides of the tire equatorial plane TE, and two second main grooves 2B disposed outward of the two first main grooves 2A in the widthwise direction of the tire. The main grooves 2 referred here are circumferential grooves having a width of 3% to 7% of a ground contact width 2W of the tire, and a depth of 7 mm to 12 mm.

The right and left first main grooves 2A and the right and left second main grooves 2B are symmetrically placed with respect to the tire equatorial plane TE. A center land 3 is formed between the right and left first main grooves 2A. A middle land 4 is formed between a first main groove 2A and a second main groove 2B adjacent to each other. A shoulder land 5 is provided in a shoulder region located outward of a second main groove 2B in the tire widthwise direction. An assistant groove 6 less in width than the first and second main grooves 2A and 2B extends in the middle land 4 in the tire circumferential direction TC. The assistant groove 6 referred here is a circumferential groove having a width of 1% to 4% of the tire ground contact width 2W, and a depth of 4 mm to 10 mm.

In the tread surface 1, lateral grooves 7 extending in the tire widthwise direction are also provided at prescribed intervals in the tire circumferential direction TC. The lateral grooves 7 comprise right and left first lateral grooves 8 and right and left second lateral grooves 9 disposed on the right and left sides of the tire equatorial plane TE. The right and left first lateral grooves 8 and the right and left second lateral grooves 9 are alternately disposed in the tire circumferential direction TC.

The left first lateral grooves 8 extend from the center land 3 outward in the tire widthwise direction across the left main grooves 2A and 2B and assistant groove 6 and beyond a left ground contact end TF of the tire. The right first lateral grooves 8 extend from the center land 3 outward in the tire widthwise direction across the right main grooves 2A and 2B and assistant groove 6 and beyond a right ground contact end TF of the tire. The right and left first lateral grooves 8 have inner terminal ends 8a which are disposed so as to be away from each other within the center land 3, and the center land 3 are formed as a rib continuously extending in the tire circumferential direction TC. The first lateral grooves 8 each have a width which gradually increases from the inner terminal end 8a of the first lateral groove 8 outward in the tire widthwise direction (towards the tire ground contact end TF) to a position beyond the tire ground contact end TF.

The left second lateral grooves 9 extend from the left middle land 4 outward in the tire widthwise direction across the left main groove 2B and beyond the left ground contact end TF of the tire. The right second lateral grooves 9 extend from the right middle land 4 outward in the tire widthwise direction across the right main groove 2B and beyond the right ground contact end TF of the tire. The right and left second lateral grooves 9 have inner terminal ends 9a, which are connected to the assistant grooves 6. The second lateral grooves 9 each have a width which also gradually increases from the inner terminal end 9a outward in the tire widthwise direction (towards the tire ground contact end TF) to a position beyond the tire ground contact end TF.

Each middle land 4 is formed from first blocks 4A defined by a second main groove 2B, assistant groove 6, first lateral grooves 8 and second lateral grooves 9, and second blocks 4B defined by a first main groove 2A, assistant groove 6, and first lateral grooves 8, the second blocks being greater in length in the tire circumferential direction TC than the first blocks 4A. Each shoulder land 5 is formed from blocks 5A defined by a second main groove 2B, first lateral grooves 8 and second lateral grooves 9.

In the rib constituting the center land 3, right and left sipes 10 extending in the tire widthwise direction are provided at prescribed intervals in the tire circumferential direction TC. Each of the sipes 10 has one terminal end which communicates with a first main groove 2 adjacent thereto. In each of the first blocks 4A of the middle land 4, sipes 11 extending in the tire widthwise direction are provided at prescribed intervals in the tire circumferential direction TC, the sipes 11 each having one terminal end which communicates with the second main groove 2B, and the other terminal end which communicates with the assistant groove 6. In each of the second blocks 4B of the middle land 4, sipes 12 extending in the tire widthwise direction are provided at prescribed intervals in the tire circumferential direction TC, the sipes 12 each having one terminal end which communicates with the assistant groove 6, and the other terminal end which communicates with the first main groove 2A Also, in each of the blocks 5A of the shoulder land 5, sipes 13 extending in the tire widthwise direction are disposed at prescribed intervals in the tire circumferential direction TC.

The tread surface 1 has a ground contact surface region 1G located between the right and left tire ground contact ends TF. The area percentage of the grooves in the entire ground contact surface region 1G is in the range of 18% to 33%. If the groove area percentage is less than 18%, it is difficult to improve on-snow performance. On the other hand, if the groove area percentage in the ground contact surface region 1G is beyond 33%, on-ice performance is significantly deteriorated. It is preferably 18% to 27% from the viewpoint of on-ice performance.

The ground contact surface region 1G has a center region portion 1C located on the center side between positions P1 and P2 of 33% of a half ground contact width W of the tire from the tire equatorial plane TE towards opposite sides in the tire widthwise direction, and side region portions 1S located on the opposite sides of the center region portion 1C, the tire half ground contact width being a distance from the tire equatorial plane TE to the tire ground contact end TF in the widthwise direction (axial direction) of the tire. The area percentage of the grooves in the center region portion 1C is less than the groove area percentage in the entire ground contact surface region 1G, and the groove area percentage in the center region portion 1C is less than that in the side region portions 1S, thereby making a ground contact area of the tread surface 1 on the center side greater, which enhances icy-road-hugging properties.

The assistant groove 6 annularly extends in the tire circumferential direction TC, bending in a zigzag path, and comprises first inclination portions 6A which are greater in length than an interval between lateral grooves 8 and 9 adjacent to each other and extend in an inclined manner with respect to the tire circumferential direction TC, and second inclination portions 6B which are less in length than the first inclination portions 6A and extend in an inclined manner with respect to the tire circumferential direction TC, the first inclination portions 6A and second inclination portions 6B being alternately connected to each other. The second lateral grooves 9 communicate with parts connecting the first inclination portions 6A and second inclination portions 6B. By extending the assistant groove 6 in a zigzag manner in the tire circumferential direction TC, the assistant groove 6 provides edge components in the tire widthwise direction, offering traction properties on ice.

According to the present invention described above, since the right and left first lateral grooves 8 extending from the center land 3 beyond the tire ground contact ends TF are arranged in the tire circumferential direction TC in addition to the four main grooves 2, both drainage characteristics and snow-expelling characteristics can be ensured by way of the grooves 2 and 8. Therefore, snow-expelling characteristics during running on a sherbet-like snowy road surface are enhanced, and driving performance on a sherbet-like snowy road surface can be improved.

By increasing the width of the right and left first lateral grooves 8 from their inner terminal ends 8a towards the tire ground contact ends TF, snow in the first lateral grooves 8 can be smoothly expelled towards the outer sides of the tire. Therefore, snow-expelling characteristics during running on a sherbet-like snowy road surface can be further enhanced, and driving performance on a sherbet-like snowy road surface is more improvable.

On the other hand, since the inner terminal ends 9a of the second lateral grooves 9 do not communicate with the first main grooves 2A but are located within the middle lands 4, land portions (blocks 4B) which are greater in length in the tire circumferential direction are formed on the tire equatorial plane sides of the middle lands 4, whereby the center land 3 in the form of a rib and the blocks 4B are disposed on the tire equatorial plane side of the tread surface 1, which increases rigidity of the tread surface 1 on the center side and provides a high edge effect on ice by means of the sipes 10 and 12 placed there; the groove area percentage in the center region portion 1C of the tread surface 1 is less, whereby the ground contact area of the tread surface 1 on the center side is enlarged, enhancing icy-road-hugging properties; accordingly, good on-ice performance in the same level as that of the prior art tire can be ensured.

By disposing the assistant grooves 6 extending in the tire circumferential direction TC in addition to the four main grooves 2, cornering performance on a snowy road surface can be maintained in the same level as that of the prior art tire; since the groove area percentage in the side region portions 1S outward of the center region portion 1C in the tire widthwise direction are greater, snow-expelling characteristics on the shoulder sides of the tread surface 1 are enhanced; accordingly, cornering performance on a snowy road surface can be improved.

In the present invention, the difference between the groove area percentage in the center region portion 1C of the tread surface 1 and the groove area percentage in the entire ground contact surface region 1G thereof is preferably in the range of 1% to 5%. If the groove area percentage difference is less than 1%, snow-expelling characteristics are so insufficient that cornering performance on snow can not be improved. If the groove area percentage difference is beyond 5%, an increase in groove area in the side region portions 1S reduces rigidity of the shoulder sides of the tread surface 1, incurring deterioration of on-ice performance.

Figure 2:
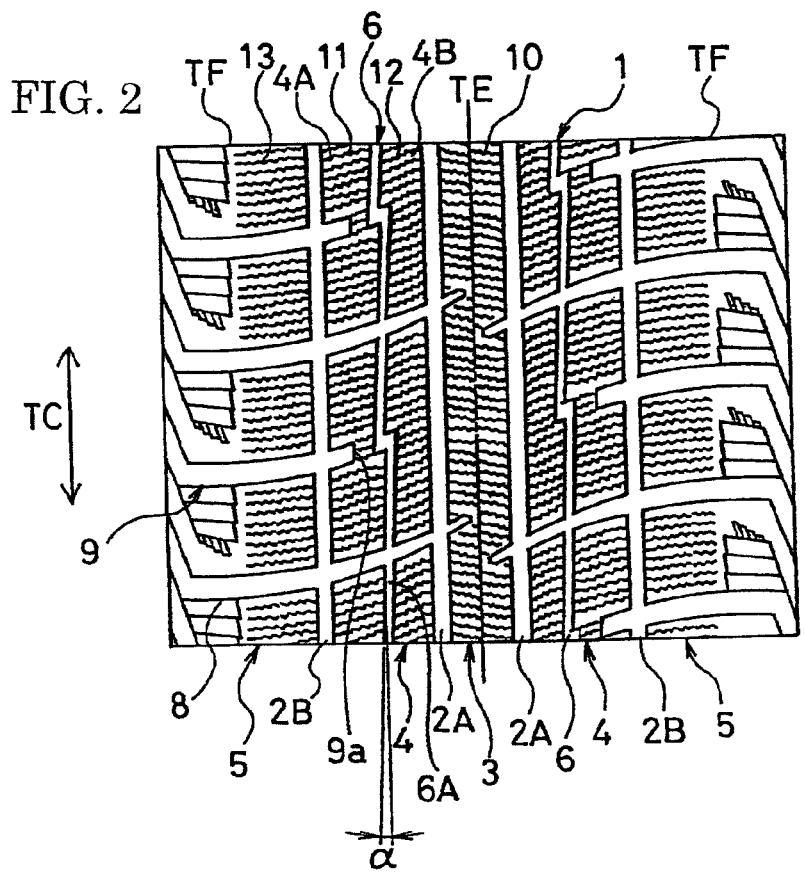
FIG. 2 is a partial development view of a tread surface showing another embodiment of a pneumatic tire according to the present invention.

As shown in FIG. 2, the second lateral grooves 9 may be structured such that the inner terminal ends 9a do not communicate with the assistant grooves 6 but are located within the middle lands 4. When a tire which puts more emphasis on on-ice performance than the pneumatic tire of FIG. 1 is obtained, the second lateral grooves 9 do not communicate with the assistant grooves 6 as described above. This increases rigidity and ground contact area of the middle lands 4, which enables on-ice performance to be enhanced.

When a tire which puts more emphasis on on-snow performance than the pneumatic tire of FIG. 1 is obtained, the second lateral grooves 9 can extend across the assistant grooves 6. The second lateral grooves 9, however, do not communicate with the first main grooves 2 but are apart from the first main grooves 2. This increases the groove area, which allows on-snow performance to be further enhanced. As described above, the inner terminal ends 9a of the second lateral grooves 9 may be properly arranged within the middle lands 4 as required.

Figure 3:
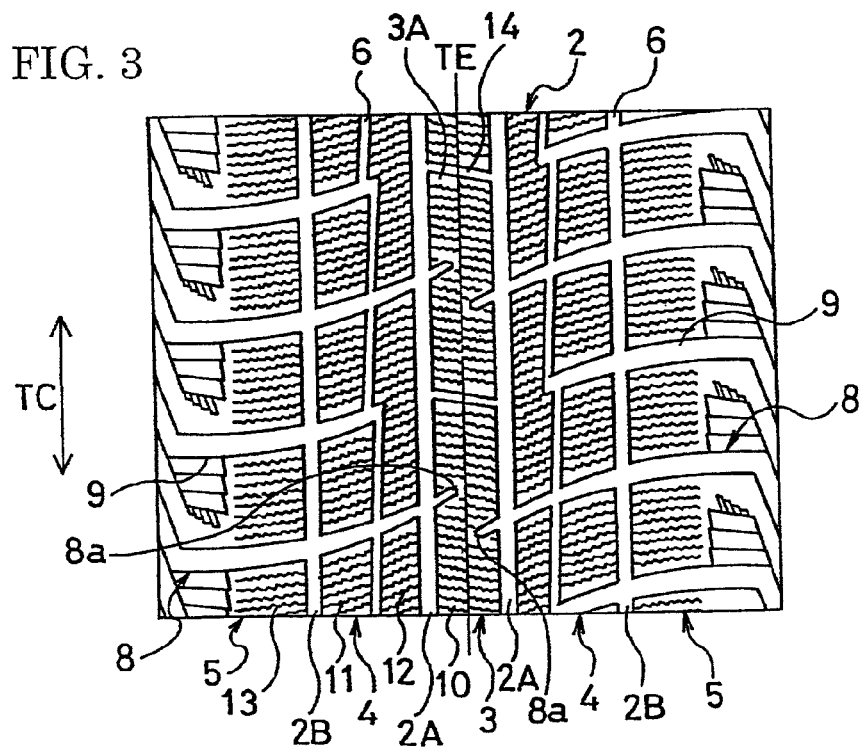
FIG. 3 is a partial development view of a tread surface showing still another embodiment of a pneumatic tire according to the present invention.

When on-snow performance is more important in the pneumatic tire of FIG. 1, it is preferable that, as shown in FIG. 3, sub-grooves 14 extending in the tire widthwise direction be further placed. The sub-grooves 14 provide an edge effect, which enhances traction characteristics on snow, enabling on-snow performance to be improved.

The sub-grooves 14 are disposed at intervals greater than the intervals between the lateral grooves 7 (8, 9) in the tire circumferential direction TC, the intervals between the sub-grooves being two times the intervals between the lateral grooves 7 in the case shown in the drawing. The center land 3 is formed from blocks 3A defined by the first main grooves 2 and the sub-grooves 14. The inner terminal ends 8a of a right and a left lateral grooves 8 are placed in a center portion of a block 3A located between sub-grooves 14 adjacent to each other in the tire circumferential direction TC.

Provision of the sub-grooves 14 deteriorates on-ice performance. In order to suppress the deterioration, it is preferable that, as shown in the drawing, the sub-grooves 14 be less in width than the first and second lateral grooves 8 and 9. The width of the sub-grooves 14 is preferably in the range of 2 mm to 5 mm. The depth of the sub-grooves 14 is preferably in the range of 4 mm to 10 mm.

The inclination angle $\alpha$ (see FIG. 2) of the first inclination portions 6A of the assistant grooves 6 with respect to the tire circumferential direction TC is preferably in the range of 3° to 10°. If the inclination angle $\alpha$ of the first inclination portions 6A is less than 3°, the edge components in the tire widthwise direction obtained by the assistant grooves 6 can not offer effective traction properties on ice. If the inclination angle $\alpha$ of the first inclination portions 6A is beyond 10°, the blocks 4A and 4B defined by the assistant grooves 6 have parts with a narrow width and are irregular in shape, resulting in that good block rigidity can not be ensured.

The first lateral grooves 8 and the second lateral grooves 9 may extend so as to incline with respect to the tire widthwise direction, as shown in the drawings. The angles $\beta 1$ and $\beta 2$ thereof with respect to the tire widthwise direction is preferably in the range of 0° to 45° in the ground contact surface region 1G. If the angles 61 and 62 of the lateral grooves 8 and 9 exceed 45°, the edge effect obtained by the first lateral grooves 8 and second lateral grooves 9 on an icy and snowy road surface is deteriorated, which degrades braking and traction properties. When the first lateral grooves 8 and the second lateral grooves 9 extend in the form of arcs as shown in the drawings, the angles $\beta 1$ and $\beta 2$ with respect to the tire widthwise direction are angles, with respect to the tire widthwise direction, of tangent lines with respect to lines passing the centers of the widths of the first lateral grooves 8 and second lateral grooves 9.

In the present invention, in the case of pneumatic tires for passenger cars which are defined by JATMA, the above tire ground contact ends TF are tire ground contact ends measured under conditions that the tire is assembled to a standard rim defined by JATMA and inflated to an air pressure of 230 kPa, and that a load of 70% of a maximum load capability defined by JATMA is added to the tire. In the case of the tires which are not defined by JATMA but are defined by ETRTO or TRA, the above tire ground contact ends TF are tire ground contact ends measured under conditions that the tire is assembled to a standard rim defined by ETRTO or TRA and inflated to an air pressure of 230 kPa, and that a load of 70% of a maximum load capability defined by ETRTO or TRA is added to the tire. The tire ground contact width 2W and the tire half ground contact width W are widths also measured as in the above.

In the case of tires other than pneumatic tires for passenger cars defined by JATMA, the above tire ground contact ends TF are tire ground contact ends measured under conditions that the tire is assembled to a standard rim defined by JATMA and inflated to an air pressure corresponding to a maximum load capability defined by JATMA, and that a load of 100% of the maximum load capability is added to the tire. In the case of the tires which are not defined by JATMA but are defined by ETRTO or TRA, the above tire ground contact ends TF are tire ground contact ends measured under conditions that the tire is assembled to a standard rim defined by ETRTO or TRA and inflated to an air pressure corresponding to a maximum load capability defined by ETRTO or TRA, and that a load of 100% of the maximum load capability is added to the tire. The tire ground contact width 2W and the tire half ground contact width W are widths also measured under the same conditions as these.

The above-described groove area percentage of the ground contact surface region 1G, groove area percentage of the center region portion 1C, groove area percentage of the side region portions 1S of the tread surface 1 are each the percentage of actual groove area when a tire comes into engagement with a road surface under the same conditions as the measurement of the tire ground contact ends described above.

The present invention is preferably applied to pneumatic tires for passenger cars and pneumatic tires for small trucks in particular.

EXAMPLE

Prepared were test tires according to the present invention tires 1 to 5 (present examples 1 to 5), comparative tires 1 to 4 (comparative examples 1 to 4), and conventional tire (conventional example), each having a tire size of 215/60R16, in which the tread pattern, groove area percentage of the ground contact surface region, and groove area percentage of the center region portion were as shown in Table 1.

The present invention tires 1 to 5, and the comparative tires 1 to 4 each have first lateral grooves and second lateral grooves with the angles $\beta 1$ and $\beta 2$ varying in the range of 0 to 37°. Also, they each have assistant grooves having first inclination parts with the inclination angle $\alpha$ of 5°.

The test tires were assembled to rims, inflated to an air pressure of 230 kPa, and mounted on a front-wheel-drive car of 2500 cc displacement with an ABS (anti-lock braking system). Evaluation testing for on-ice performance and on-snow performance was carried out according to the testing methods shown below, obtaining the results shown in Table 1.

On-Ice Performance (Braking Performance)

The car was run on an icy road test course, and full braking was applied to the car running straight at a speed of 40 km/h until the car was stopped, measuring the braking distance. The evaluation result thereof is represented by an index where the conventional tire is 100. As the index is greater, the braking distance is shorter and braking performance on ice is better.

On-Snow Performance a) Traction Performance

On a snowy road test course including a sherbet-like snowy road surface, the car was started with the throttle fully opened, and the time until the car reached a speed of 35 km/h from the start was measured. The evaluation result thereof is represented by an index where the conventional tire is 100. As the index is greater, the reaching time is shorter and traction performance on snow is better. An index equal to or greater than 105 means a remarkable effect.

b) Turning Performance

On a snowy road test course including a sherbet-like snowy road surface, a laterally accelerated velocity acting on the car was measured when the car was turned with a circle having a radius of 30 m. The evaluation result thereof is represented by an index where the conventional tire is 100. As the index is greater, the laterally accelerated velocity is less and turning performance on snow is better. An index equal to or greater than 105 means a remarkable effect.

TABLE 1

Figure 4:
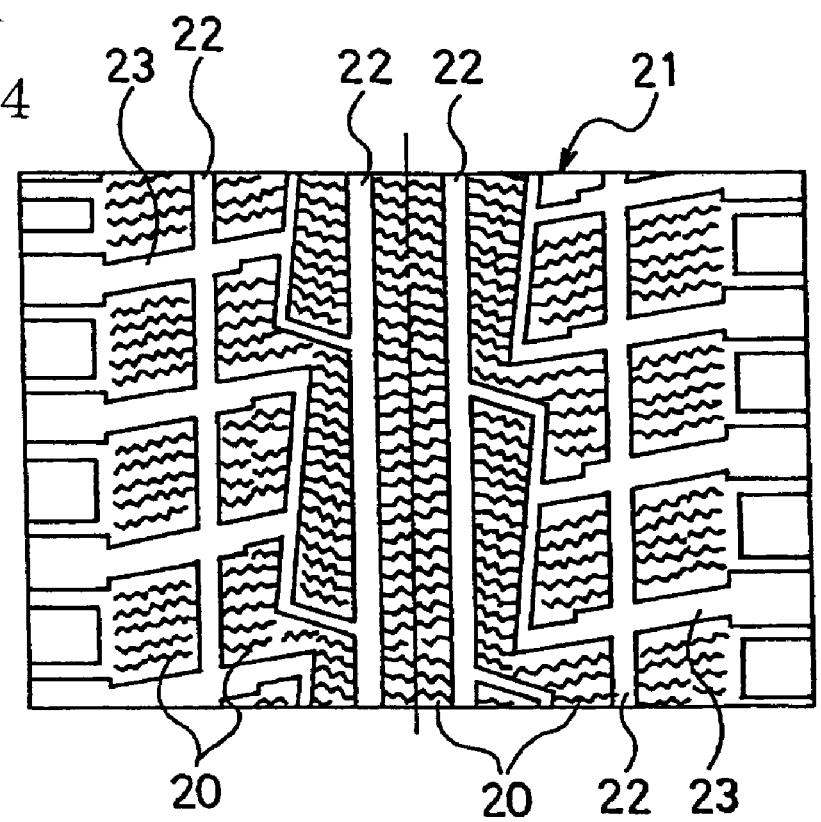
FIG. 4 is a partial development view of the tread surface of a conventional pneumatic tire.

| | Conventional Example | Present Example 1 | Present Example 2 | Present Example 3 | Present Example 4 | Present Example 5 | Comparative Example 1 | Comparative Example 2 | Comparative Example 3 | Comparative Tire 4 |
|---|---|---|---|---|---|---|---|---|---|---|
| Tread Pattern | FIG. 4 | FIG. 1 | FIG. 1 | FIG. 1 | FIG. 2 | FIG. 3 | FIG. 1 | FIG. 1 | FIG. 1 | FIG. 1 |
| Groove Area Percentage (%) in Ground Contact Surface Region | 22 | 22 | 18 | 33 | 22 | 22 | 22 | 22 | 17 | 34 |
| Groove Area Percentage (%) in Center Region Portion | 22 | 20 | 16 | 31 | 20 | 20 | 22 | 24 | 15 | 32 |
| On-Ice Performance | 100 | 100 | 102 | 99 | 101 | 100 | 95 | 94 | 104 | 95 |
| On-Snow Performance | | | | | | | | | | |
| Traction Performance | 100 | 106 | 105 | 107 | 105 | 107 | 106 | 107 | 103 | 108 |
| Turning Performance | 100 | 106 | 105 | 108 | 105 | 107 | 107 | 107 | 103 | 108 |

From Table 1, it is understood that the present invention tires are equal to or greater than 99 in on-ice performance, and can improve on-snow performance on a snowy road surface including a sherbet-like snowy road surface while maintaining on-ice performance at the same level as the prior art tire.

INDUSTRIAL APPLICABILITY

The present invention having the aforementioned excellent effects is preferably applied to pneumatic tires for passenger cars and for small trucks in particular.

The invention claimed is:

1. A pneumatic tire having a tread surface,
a first main groove extending in a circumferential direction of the tire being provided on each of right and left sides of an equatorial line of the tire in the tread surface, a second main groove extending in the circumferential direction of the tire being disposed on an outer side of the first main grooves in a widthwise direction of the tire, a center land being formed between the first main grooves, middle lands being formed between the first main grooves and the second main grooves, shoulder lands being formed outward of the second main grooves in the widthwise direction of the tire, sipes extending in the widthwise direction of the tire being disposed in each of the lands at prescribed intervals in the circumferential direction of the tire, lateral grooves extending in the widthwise direction of the tire being provided in the tread surface at prescribed intervals in the circumferential direction of the tire;
wherein the middle lands each have an assistant groove less in width than the first and second main grooves, the assistant groove extending in the circumferential direction of the tire;
the lateral grooves comprise right and left first lateral grooves and right and left second lateral grooves disposed on the right and left sides of the equatorial line of the tire, the right and left first lateral grooves extending from the center land outward in the widthwise direction of the tire beyond ground contact ends of the tire, the right and left second lateral grooves extending from the middle lands outward in the widthwise direction of the tire beyond the ground contact ends of the tire, the right and left first lateral grooves and the right and left second lateral grooves being alternately disposed in the circumferential direction of the tire;
the right and left first lateral grooves have inner terminal ends which are disposed so as to be apart from each other in the center land, the right and left second lateral grooves having inner terminal ends which are located within the middle lands; and
the tread surface has a ground contact surface region located between the right and left ground contact ends of the tire, the ground contact surface region having a center region portion on a center side thereof and side region portions located on opposite sides of the center region portion, a groove area percentage in the entire ground contact surface region being in a range of 18% to 33%, a groove area percentage in the center region portion being less than the groove area percentage in the entire ground contact surface region.

2. The pneumatic tire according to claim 1, wherein the first lateral grooves have widths which increase from the inner terminal ends of the first lateral grooves towards the ground contact ends of the tire.

3. The pneumatic tire according to claim 1, wherein the second lateral grooves are connected to the assistant grooves at the inner terminal ends thereof, the middle lands comprising first blocks defined by the second main grooves, assistant grooves, first lateral grooves and second lateral grooves, and second blocks defined by the first main grooves, assistant grooves and first lateral grooves, the second blocks being greater in length in the circumferential direction of the tire than the first blocks.

4. The pneumatic tire according to claim 3, wherein the second lateral grooves have widths which increase from the inner terminal ends of the second lateral grooves towards the ground contact ends of the tire.

5. The pneumatic tire according to claim 1, wherein the assistant grooves extend in a zigzag manner in the circumferential direction of the tire.

6. The pneumatic tire according to claim 5, wherein the assistant grooves comprise first zigzag portions which are greater in length than an interval between lateral grooves adjacent to each other and extend in an inclined manner with respect to the circumferential direction of the tire, and second zigzag portions which are less in length than the first zigzag portions and extend in an inclined manner with respect to the circumferential direction of the tire, the first zigzag portions and second zigzag portions being alternately connected to each other, the first zigzag portions having an inclination angle of 3° to 10° with respect to the circumferential direction of the tire.

7. The pneumatic tire according to claim 1, wherein the first lateral grooves and the second lateral grooves have angles in a range of 0° to 45° with respect to the widthwise direction of the tire.

8. The pneumatic tire according to claim 1, wherein sub-grooves extending in the widthwise direction of the tire between the first grooves are disposed in the circumferential direction of the tire at intervals longer than the intervals between the lateral grooves, the center land comprising blocks defined by the first main grooves and the sub-grooves.

9. The pneumatic tire according to claim 8, wherein the sub-grooves are disposed in the circumferential direction of the tire at intervals which are two times the intervals between the lateral grooves, the inner terminal ends of a right and a left first lateral grooves being placed in a center portion of a block located between sub-grooves adjacent to each other in the circumferential direction of the tire.

10. The pneumatic tire according to claim 8, wherein the sub-grooves are less in width than the first and second lateral grooves.

* * * * *